United States Patent
Kuroda

(10) Patent No.: US 8,139,084 B2
(45) Date of Patent: Mar. 20, 2012

(54) IMAGE DISPLAY DEVICE AND METHOD OF DISPLAYING IMAGE

(75) Inventor: Tomonori Kuroda, Tokyo (JP)

(73) Assignee: NEC Corporation, Tokyo (JP)

( * ) Notice: Subject to any disclaimer, the term of this patent is extended or adjusted under 35 U.S.C. 154(b) by 808 days.

(21) Appl. No.: 12/294,277

(22) PCT Filed: Mar. 27, 2007

(86) PCT No.: PCT/JP2007/000303
§ 371 (c)(1),
(2), (4) Date: Sep. 24, 2008

(87) PCT Pub. No.: WO2007/111022
PCT Pub. Date: Oct. 4, 2007

(65) Prior Publication Data
US 2009/0251408 A1 Oct. 8, 2009

(30) Foreign Application Priority Data
Mar. 29, 2006 (JP) .................................. 2006-090851

(51) Int. Cl.
*G09G 5/00* (2006.01)

(52) U.S. Cl. ........................................................ 345/619
(58) Field of Classification Search .................... None
See application file for complete search history.

(56) References Cited

FOREIGN PATENT DOCUMENTS

| JP | 1998224820 A | 8/1998 |
|---|---|---|
| JP | 2004144822 A | 5/2004 |
| JP | 2005024737 A | 1/2005 |
| JP | 2005091475 A | 4/2005 |
| JP | 2006041795 A | 2/2006 |

OTHER PUBLICATIONS

Machine translation of JP-2006-041795, Feb. 9, 2006.*
Machine translation of JP-2005-024737, Jan. 27, 2005.*
Machine translation of JP-10-224820, Aug. 21, 1998.*
International Search Report for PCT/JP2007/000303 mailed Jun. 19, 2007.

* cited by examiner

*Primary Examiner* — Paul Huber

(57) ABSTRACT

Under an LCD panel (241) a prism sheet (242) is provided, and a light beam is emitted in a first direction (243) at a timing that a first LED group (247) is turned on, so that an eye (202L) located at this position can view a first image (211). When a second LED group (248) is turned on the light beam is emitted in a second direction (244), so that the eye (202R) located at this position can view a second image (212). These images (211, 212) are combined to thereby constitute a larger image.

12 Claims, 16 Drawing Sheets

8,139,084 B2

IMAGE DISPLAY DEVICE AND METHOD OF DISPLAYING IMAGE

This application is a 371 of PCT/JP2007/000303, filed Mar. 27, 2007.

TECHNICAL FIELD

The present invention relates to an image display device including a display panel that displays an image and to a method of displaying an image, and more particularly to an image display device and a method of displaying an image appropriate for an information processing apparatus such as a mobile phone with a relatively small display panel, as well as for a digital camera and a small-sized video camera.

BACKGROUND ART

Most information processing apparatuses tend to be made smaller for easier portability, while the information to be thereby handled is increasing. Such information processing apparatuses are best exemplified by pocket-sized devices such as a mobile phone, a personal handy-phone system (PHS), and a personal digital assistant PDA).

While such small-sized information processing apparatuses have become quite comfortable to carry because of the advancement of communication technology and various related techniques, the area allocated for displaying is extremely limited. Accordingly, images and character information have to be reduced in size when a larger amount of those is to be displayed, which leads to the drawback that the images become more difficult to recognize.

As a solution, splitting a large screen so as to display a split portion in different information processing apparatuses has been proposed (for example, patented document 1). According to this proposal, for example, when a chess board is to be displayed on the large screen, a first information processing apparatus displays a half of the chess board on the first mover side. A second information processing apparatus displays the other half of the chess board on the second mover side. Thus, upon combining the two information processing apparatuses the entirety of the chess board can be displayed, and the plurality of pieces on the chess board can be identifiably displayed among one another.

[Patented document 1] Japanese Laid-open patent publication No. 2004-144822 (Paragraph 0040 and FIG. 3)

SUMMARY

With the foregoing proposal, however, since the image is split to be displayed on the plurality of information processing apparatuses, the plurality of information processing apparatuses such as mobile phones has to be physically present. Also, a communication means that distributes the images to these information processing apparatuses is required, which not only makes the communication system more complicated, but also increases the communication cost because the communication involves the plurality of information processing apparatus. Further, even though the information processing apparatuses are brought close to each other, the display region of the display panel cannot be continuously located. Accordingly, although the disadvantage may be minor in such a case as displaying the first mover-side half and the second mover-side half of the chess board separately on the display panel of the respective information processing apparatuses, the entire image cannot be recognized in such a case where a face of a person is displayed in split images on a plurality of information processing apparatuses.

FIG. 15 illustrates a conventional method of continuously displaying an enlarged image. According to this method, light from a backlight 103 is uniformly emitted to a liquid crystal cell 101 through a light guide plate 102, so as to cause a liquid crystal display 105 to display an image 106 of, for example, an arrow shape. Upon viewing the image 106 from an upper direction of the drawing through a convex lens 107 such as a loupe, the image 106 enlarged to a virtual image 108 can be recognized.

FIG. 16 depicts the principle of an image on a liquid crystal display and the enlarged image thereof. Over an image shown on the liquid crystal display 105, an enlarged image 111 having a larger display area is formed. In this case, the image of clouds above a mountain range displayed on the liquid crystal display 105 is recognized as the enlarged image 111.

The method of employing the convex lens 107 to view the enlarged image of the image 106 as shown in FIGS. 15 and 16 requires constantly carrying the convex lens 107 which is relatively heavy. Also, except for the case where the viewer is seated at a desk or a table, the viewer has to hold the information processing apparatus by a hand and the convex lens 107 by the other hand, when enlarging the image. In other words, the both hands are occupied for viewing the enlarged image, which makes it impossible to, for example, use a hand to write down a memorandum while viewing the image. Besides, although the image is enlarged by the convex lens 107, the display panel such as the liquid crystal display displays the image as a set of each pixel. Accordingly, enlarging the image often results in merely viewing a coarser image. This is the same effect as what is known as ineffective enlargement, which does not achieve an increase in information despite the enlargement.

Further, the method that employs the convex lens 107 only enlarges the image itself, and not the image region. Besides, employing the convex lens 107 may incur drawbacks such as emergence of optical strain and chromatic aberration in the image.

Thus, an exemplary object of the invention is to provide an image display device capable of displaying, on a single display panel, a larger image region than the display area of the display panel, and a method of displaying the image on such device.

In one exemplary aspect of the invention, there is provided an image display device including a display panel that displays a sheet of image; a spatial region setting unit that defines a plurality of spatial regions where an image displayed on the display panel can be visually recognized from mutually different spatial positions; an image splitter that splits a piece of image having a larger display area than the sheet of image corresponding to a display area of the display panel, into a plurality of sheets of images respectively corresponding to each of the plurality of spatial regions; and an image display unit that causes the display panel to splitly display the plurality of sheets of images in different display directions, such that each of the plurality of sheets of images split by the image splitter can be visually recognized from the corresponding one of the mutually different spatial positions.

Thus, in one exemplary aspect of the invention, the plurality of spatial regions where the image displayed on the display panel can be visually recognized from different spatial positions is defined in advance by the spatial region setting unit, and the sheets of images split by the image splitter correspond to the respective spatial regions. Then, the image display unit executes the control so as to cause the display panel to splitly display the sheets of images in different display directions, such that each sheet of image split by the image splitter can be visually recognized from the corresponding one of the mutually different spatial positions.

Regarding the display method, each sheet of image split to be viewed from different directions may be displayed in parallel in a time-division manner, or one of the sheets of images may be selectively displayed according to the relative spatial position of the viewer's eye. The spatial regions may be switched by displacing the eye, or by rotating the display panel either horizontally or vertically. Alternatively, the display panel may be horizontally displaced so as to switch the spatial region to be displayed, for selectively viewing each display panel in the case where the plurality of display panels is aligned on a plane.

In another exemplary aspect of the invention, there is provided a method of displaying an image including: splitting a piece of image having a larger display area than a sheet of image corresponding to a display area of a display panel, into a plurality of sheets of images respectively corresponding to each of a plurality of predetermined spatial regions; and sequentially selecting one of the sheets of images split in the image splitting step and corresponding to the spatial region designated for viewing among the plurality of spatial regions, and causing the display panel to display the selected image.

Thus, according to the present invention, an image having a larger area can be split and sequentially displayed, by splitting an image into a predetermined number of sheets in the image splitting step, to enable displaying the image in a larger region than the size of a single display panel, and sequentially selecting one of those images corresponding to the spatial region designated for viewing out of the plurality of spatial regions, to thereby display the selected image on the display panel. Also, the method is applicable not only to a still image but also to a moving image.

Thus, in one exemplary aspect of the invention, the image displayed on the display panel that displays a sheet of image can be switched according to the spatial region, which enables displaying an image having a larger display area than an image corresponding to the display area of the display panel, in a time-division manner. Accordingly, a small-sized equipment such as a mobile phone can still display a more extensive image, and therefore a small-sized, light-weighted and inexpensive image display device can be obtained. Moreover, there is no need to reduce the image area of the same image when displaying that image on the display panel, which eliminates the need to degrade the resolution of the image, thereby facilitating displaying high-quality images.

BRIEF DESCRIPTION OF THE INVENTION

The above and other objects, features and advantages will become more apparent through the following description of preferred embodiments and the accompanying drawings.

EXEMPLARY EMBODIMENT

Hereunder, exemplary embodiments of the present invention will be described in details.

An Exemplary Embodiment

Figure 1:
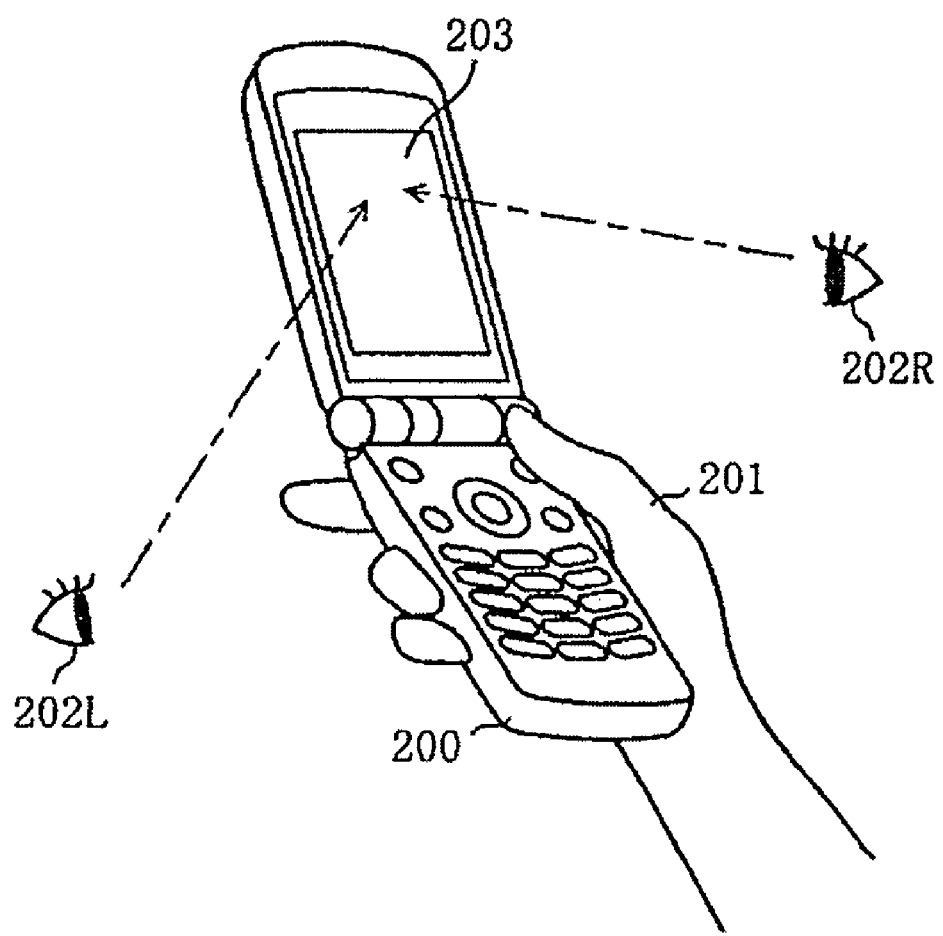
FIG. 1 is a perspective view showing a state of use of a mobile phone including an image display device according to an exemplary embodiment of the present invention.

FIG. 1 illustrates the appearance of a mobile phone including an image display device according to an exemplary embodiment of the present invention. On the mobile phone 200, an image displayed on a display panel 203 is switched to a plurality of images, as a user holding the mobile phone in a hand 201 changes the position of his/her eye 202. The boundaries between the plurality of images are continuous, and therefore the images displayed on the display panel 203 appear as a piece of continuous image, allowing the user to recognize an image having a wide angle of view.

Figure 2:
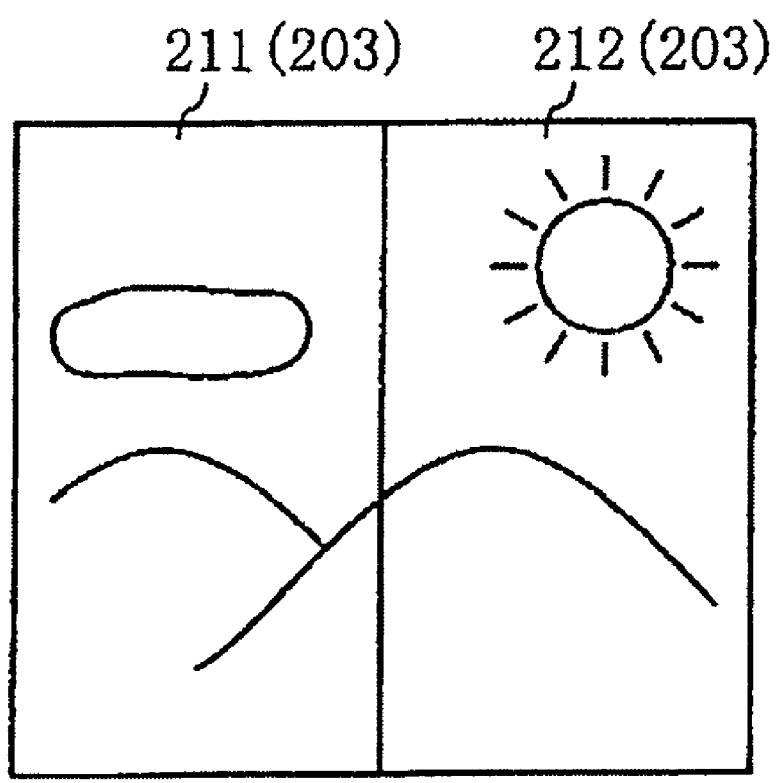
FIG. 2 is an explanatory drawing showing an example of an image displayed on the display panel of the mobile phone according to the exemplary embodiment.

FIG. 2 depicts an example of an image displayed on the display panel of the mobile phone according to this exemplary embodiment. It will be assumed here that two images are displayed on the display panel 203 according to the viewing position (spatial region). A first image 211 represents the image on the display panel 203 viewed from the user's eye 202L which is on (has moved to) the left side in FIG. 1, and a second image 212 represents the image on the display panel 203 viewed from the user's eye 202R which is on (has moved to) the right side in FIG. 1. Actually, when the user moves his/her face to the left and the right with respect to the display panel 203 shown in FIG. 1, the images 211, 212 are alternately switched.

Figure 3:
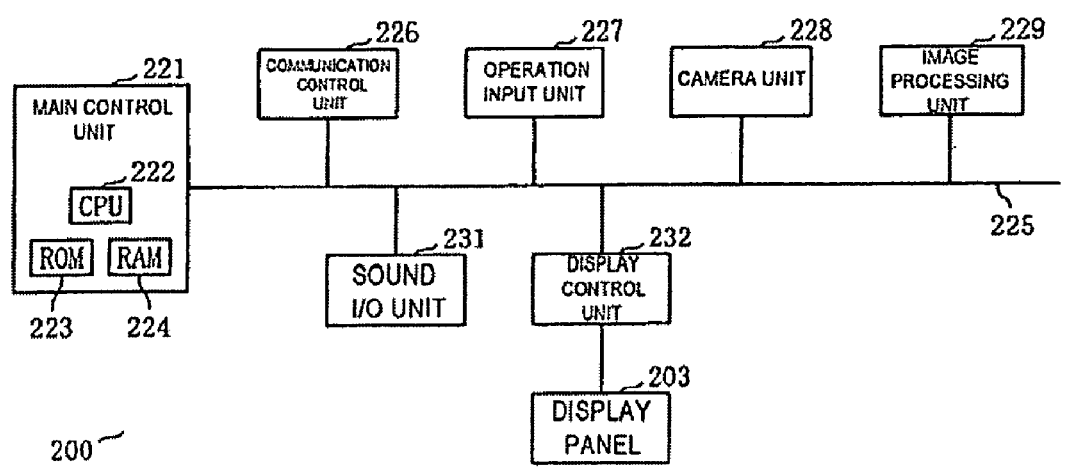
FIG. 3 is a block diagram showing an outline of the circuit configuration of the mobile phone according to the exemplary embodiment.

FIG. 3 shows an outline of the circuit configuration of the mobile phone. The mobile phone 200 includes a main control unit 221 that executes the overall control of the mobile phone 200. The main control unit 221 includes a central processing unit (CPU) 222, a read only memory (ROM) 223 in which a control program is stored, and a random access memory (RAM) 224 serving as an operational memory. The main control unit 221 is connected to the respective units in the device via a signal transmitter 225 such as a bus.

Among those units, a communication control unit 226 controls the verbal communication with a wireless base station (not shown), and is also capable of executing other types of wireless communication such as infrared communication. Further, data communication can also be executed with an external party (not shown) through a universal serial bus (USB) port (not shown). An operation input unit 227 includes various keys shown in FIG. 1, by which various data such as a dial number can be input. A camera unit 228 includes an imaging device such as a charge-coupled device (CCD), to thereby shoot a still image or a moving image. An image processing unit 229 serves to process an image shot by the camera unit 228, or an image input through the communication control unit 226. In this exemplary embodiment, the image processing unit 229 also serves to split the image to be displayed on the display panel 203. A sound I/O unit 231 is engaged in inputting and outputting the voice for phone communication and outputting an alarm sound. A display control unit 232 is a circuit that drives the display panel 203.

Also, a part of the units except the main control unit 221, such as the communication control unit 226, may be realized as a software such that the CPU 222 executes the control program stored in the ROM 223.

Figure 4:
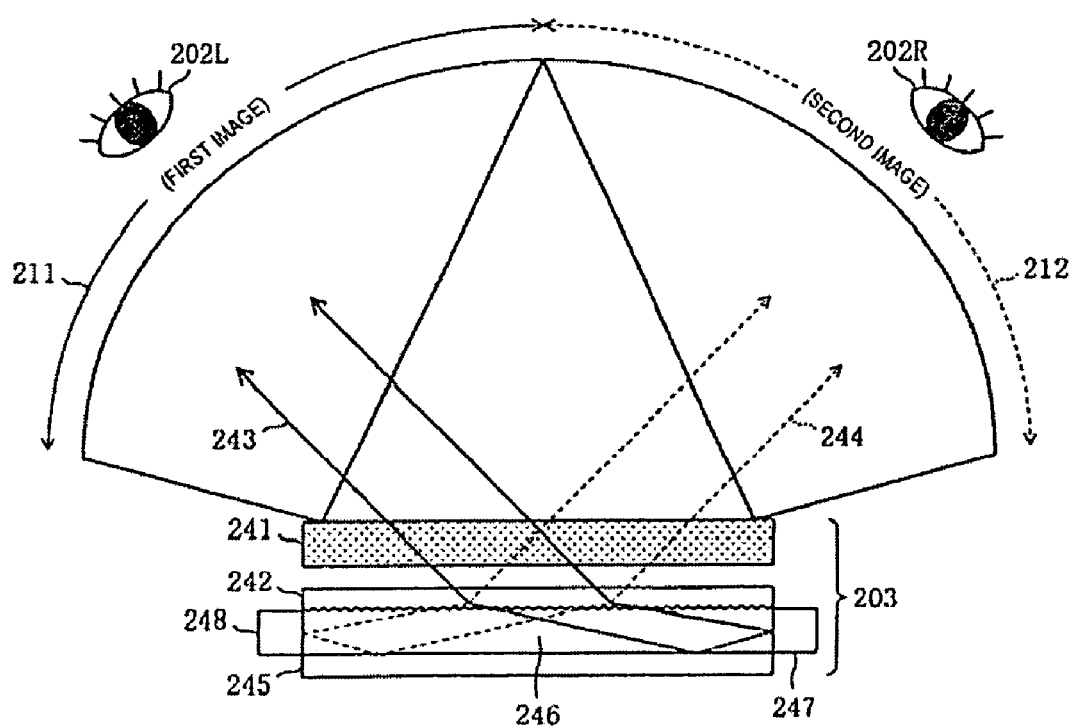
FIG. 4 is an explanatory drawing showing a cross-sectional structure of the display panel according to the exemplary embodiment, and how the images are switched according to the position of the eye.

FIG. 4 illustrates a cross-sectional structure of the display panel according to the exemplary embodiment, and how the images are switched according to the position of the eye. The display panel 203 includes a liquid crystal display (LCD) panel 241 that displays an image with electrodes (not shown) aligned in a matrix form. Under the LCD panel 241, prism sheets 242 are aligned at a predetermined interval. The prism sheet 242 according to this exemplary embodiment is an optical component that switches the direction of a light beam in two directions, namely a first direction 243 and a second direction 244, and has one surface (lower surface in FIG. 4) serrated. The prism sheet 242 is commercially available from several manufacturers.

Figure 5:
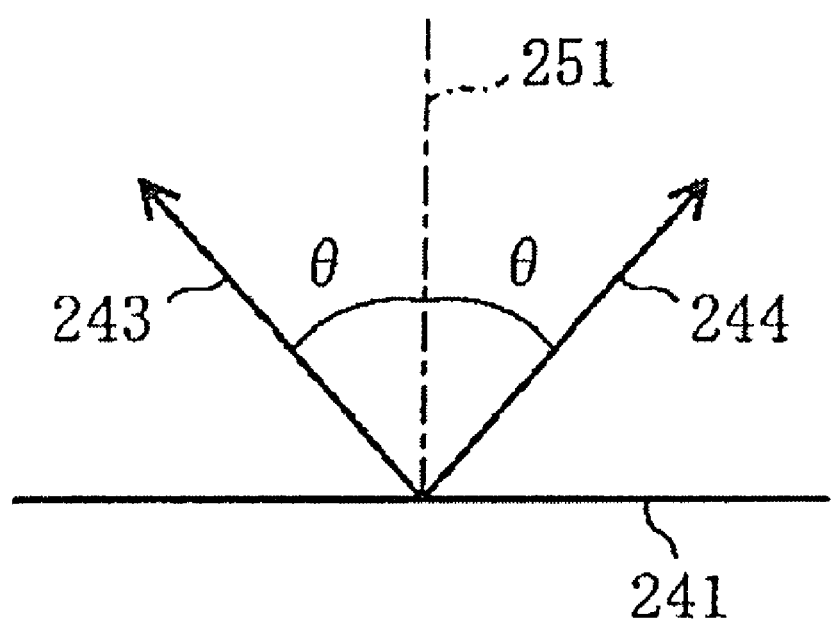
FIG. 5 is an explanatory diagram showing two directions in which light is incident on the eye when images are displayed on two display panels according to the exemplary embodiment.

FIG. 5 depicts the relationship between the two directions shown in FIG. 4. The first direction 243 and the second direction 244 are symmetrical with respect to a line 251 which is perpendicular to the LCD panel 241, and the both directions define an emission angle of θ. It is not mandatory that these directions 243, 244 symmetrically define the incident angle, but it generally suffices that the two directions are different from each other.

FIG. 4 will be again referred to. Below the prism sheet 242, reflection sheets 245 that reflect a light beam are located at a predetermined interval. Between the prism sheet 242 and the reflection sheet 245, a transparent light guide plate 246 is provided so as to transmit the light beam. At the right-hand end of the light guide plate 246 in FIG. 4, one each of first LED group 247 is disposed vertically of the sheet with a spacing, so as to form the first image 211 shown in FIG. 2. At the left-hand end of the light guide plate 246 in FIG. 4, one each of second LED group 248 is likewise disposed vertically of the sheet with a spacing, so as to form the second image 212 shown in FIG. 2.

The LCD panel 241 alternately displays the first image 211 and the second image 212, for at rates of 1/60 seconds each for example. At the timing when the first image 211 is displayed on the LCD panel 241, the first LED group 247 is turned on, so that the light of the relevant image is emitted in the first direction 243. Likewise, at the timing when the second image 212 is displayed on the LCD panel 241, the second LED group 248 is turned on, so that the light of the relevant image is emitted in the first direction 244.

For the sake of simplicity of explanation, it will be assumed here that the image is viewed with only one eye. The eye 202L of the user in the left-hand spatial region in FIG. 4 can see the first image 211, and the eye 202R of the user in the right-hand spatial region in FIG. 4 can see the second image 212. While the eye 202 is passing the central position between the two position, the image is switched from the first image 211 to the second image 212, via a process that the brain recognizes the boundary of the two images as a continuous image. Such image recognition process of the brain is similar to the process executed to form a three-dimensional image when different images are shown to the left and the right eye. Once the user learns the knack for combining the boundary between the first image 211 and the second image, he or she can easily recognize a synthesized image thereafter.

Figure 6:
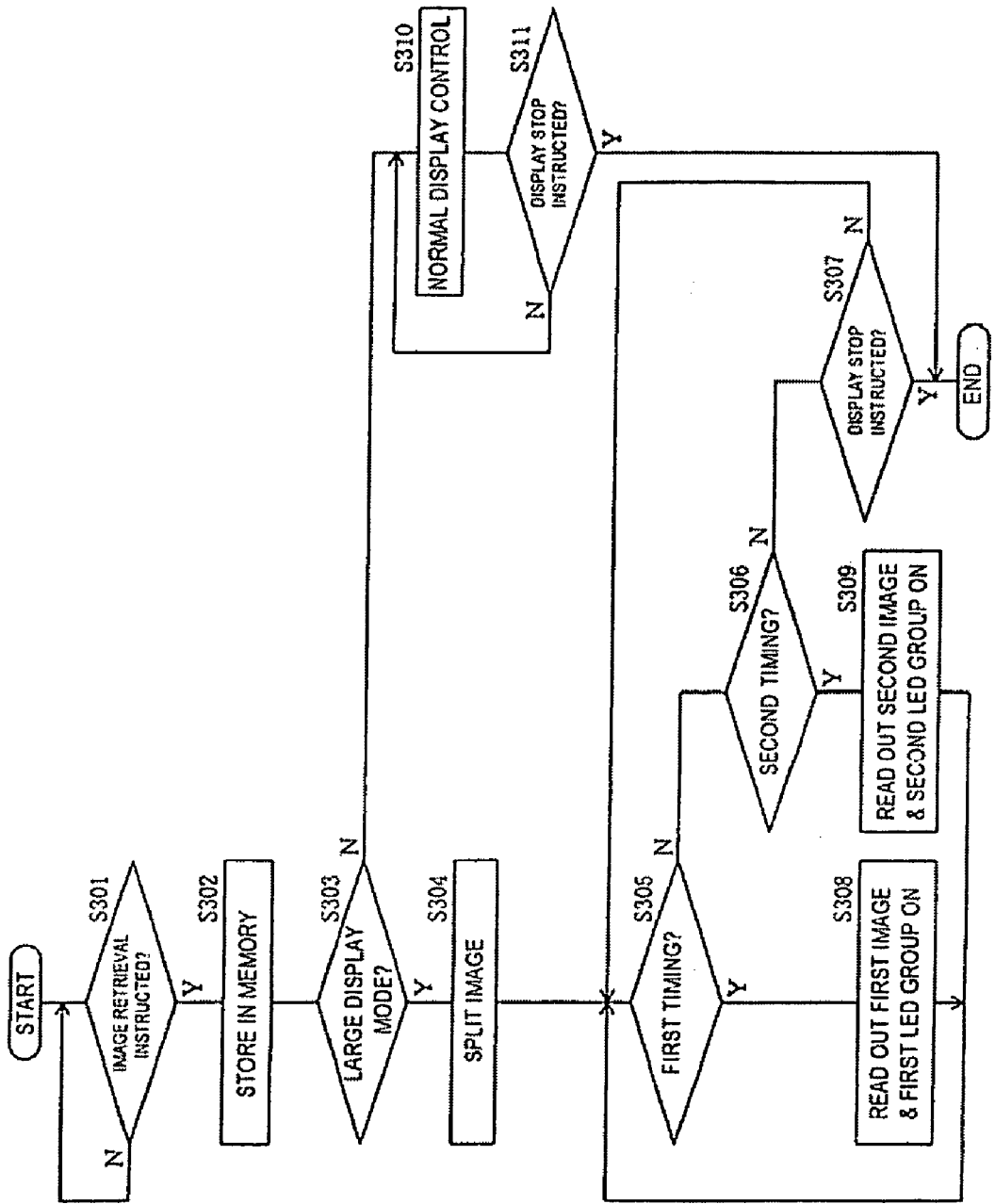
FIG. 6 is a flowchart showing a display control process, based on an instruction to display a still image according to the exemplary embodiment.

FIG. 6 indicates a display control process, based on an instruction to display a still image. Such display control is executed, for example, when the user utilizes a preview function to watch an image shot by the camera unit 228 shown in FIG. 3, or views an image attached to an e-mail received. FIG. 3 will also be referred to for the description.

When the user of the mobile phone 200 manipulates the operation input unit 227 so as to display an image, an instruction to retrieve the image is thereby generated inside the mobile phone (step S301). Upon receipt of the instruction (Y), the main control unit 221 stores the designated image in an appropriate memory (not shown) in the image processing unit 229 or in the RAM 224 for operation (step S302). Here, it will be assumed that the image is stored in a predetermined region of the RAM 224.

Under such state the main control unit 221 checks whether the instruction of the user requests a normal display mode of displaying a sheet of image corresponding to the size of the display panel 203, or a large display mode of displaying an image corresponding to two sheets (step S303). If the large display mode is requested (Y), the image stored in the RAM 224 is split into left and right two portions (step S304). In this process, the image may be split such that the boundary portions slightly overlap, for easier matching of the image. As a result, in the RAM 224, for example the first image 211 and the second image 212 shown in FIG. 2 are independently stored.

Then the main control unit 221 checks whether one of the first timing and the second timing, which alternate every 1/60 second, has reached, and whether an instruction to stop the display has been generated (step S305 to step S307). If the first timing has reached (Y at step S305), the main control unit 221 reads out the first image 211 from the RAM 224, and at the same time turns on the first light emitting diode (LED) group 247 of the display control unit 232 (step S308). As a result, the first image 211 is displayed on the LCD panel 241 shown in FIG. 4.

Figure 7:
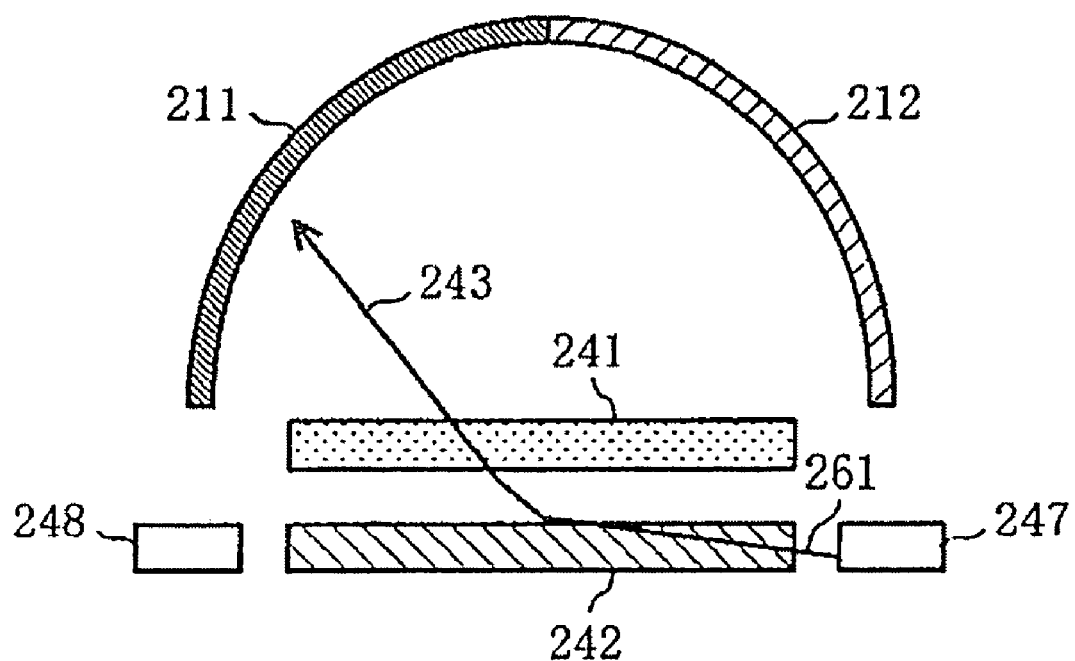
FIG. 7 is a schematic diagram for explaining how a first image is displayed according to the exemplary embodiment.

FIG. 7 depicts the state where the first image is displayed on the display panel. Under this state, the first LED group 247 is on and the second LED group 248 is off. Accordingly, a light beam 261 output by the first LED group 247 is incident upon the prism sheet 242 directly, or after being reflected by the reflection sheet 245 shown in FIG. 4 and reciprocating in the transparent light guide plate 246. Then these light beams are emitted in the first direction 243. Therefore, if the eye 202L is present in the first direction 243 (Ref. FIG. 4), the eye 202L can view the first image 211. At this moment, the second image 212 is not formed. Accordingly, the second image 212 cannot be recognized at the position of the eye 202R (Ref. FIG. 4).

FIG. 6 will be referred to again for the description. Under the state where the first image is displayed, the main control unit 221 reads out the second image 212 from the RAM 224 when another 1/60 second has elapsed and the second timing has reached (Y at step S306), unless the instruction to stop the display is generated (N at step S307), and at the same time turns on the second LED group 248 of the display control unit 232 (step S309). As a result, the second image 212 is displayed on the LCD panel 241 shown in FIG. 4.

Figure 8:
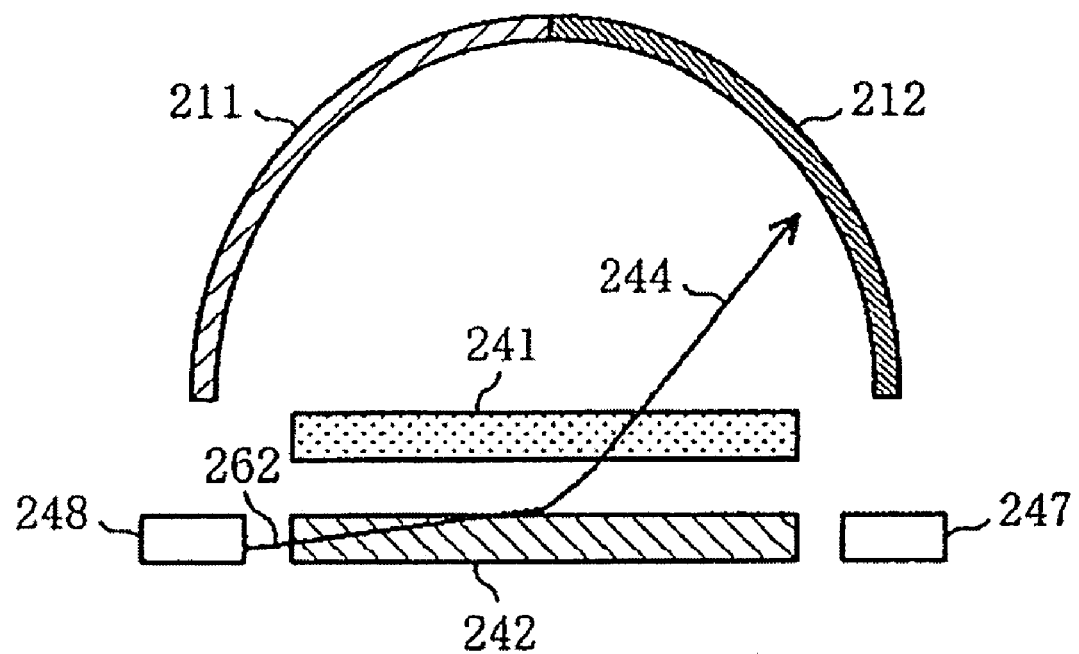
FIG. 8 is a schematic diagram for explaining how a second image is displayed according to the exemplary embodiment.

FIG. 8 depicts the state where the second image is displayed on the display panel. Under this state, the second LED group 248 is on and the first LED group 247 is off. Accordingly, a light beam 262 output by the second LED group 248 is incident upon the prism sheet 242 directly, or after being reflected by the reflection sheet 245 shown in FIG. 4 and reciprocating in the transparent light guide plate 246. Then these light beams are emitted in the second direction 244. Therefore, if the eye 202R is present in the second direction 244 (Ref. FIG. 4), the eye 202R can view the second image 212. At this moment, the first image 211 is not formed. Accordingly, the first image 211 cannot be recognized at the position of the eye 202L (Ref. FIG. 4).

FIG. 6 will be referred to again for the description. Once the second image 212 is thus displayed, the state after splitting the image at the step S304 is restored, after which the first image and the second image are repeatedly displayed every 1/60 second, until the instruction to stop displaying the image is generated (Y at step S307) in the mobile phone. The eye 202L, 202R moving to the left and the right recognizes the first image 211 and the second image 212 as a constantly present image, because of the afterimage effect. Besides, since the eye 202L, 202R physically moves to the left and the right for switching these images, the viewer has an illusion that he or she has swung the head to the left and the right so as to expand the visual field, thereby recognizing a sheet of image upon combining those images. Consequently, the single display panel 203 can display the image in a twice as large visual field area. If the instruction to stop the display is generated at the step S307 (Y), the display is finished (End).

Meanwhile, if the user has selected the display in the normal display mode (N at step S303), a display control employed in an image display device of a popular mobile phone or the like is executed (step S310). In other words, the image is adjusted to the size corresponding to the display panel 203, for being displayed. In this case, the image does not have to be switched. Accordingly, the first LED group 247 and the second LED group 248 are both turned on, so that the user views a sheet of image from a wider angle range. In the case of the normal display mode display also, the display is finished (End) when the instruction to stop the display is generated (Y at step S311).

[First Variation of the Invention]

Figure 9:
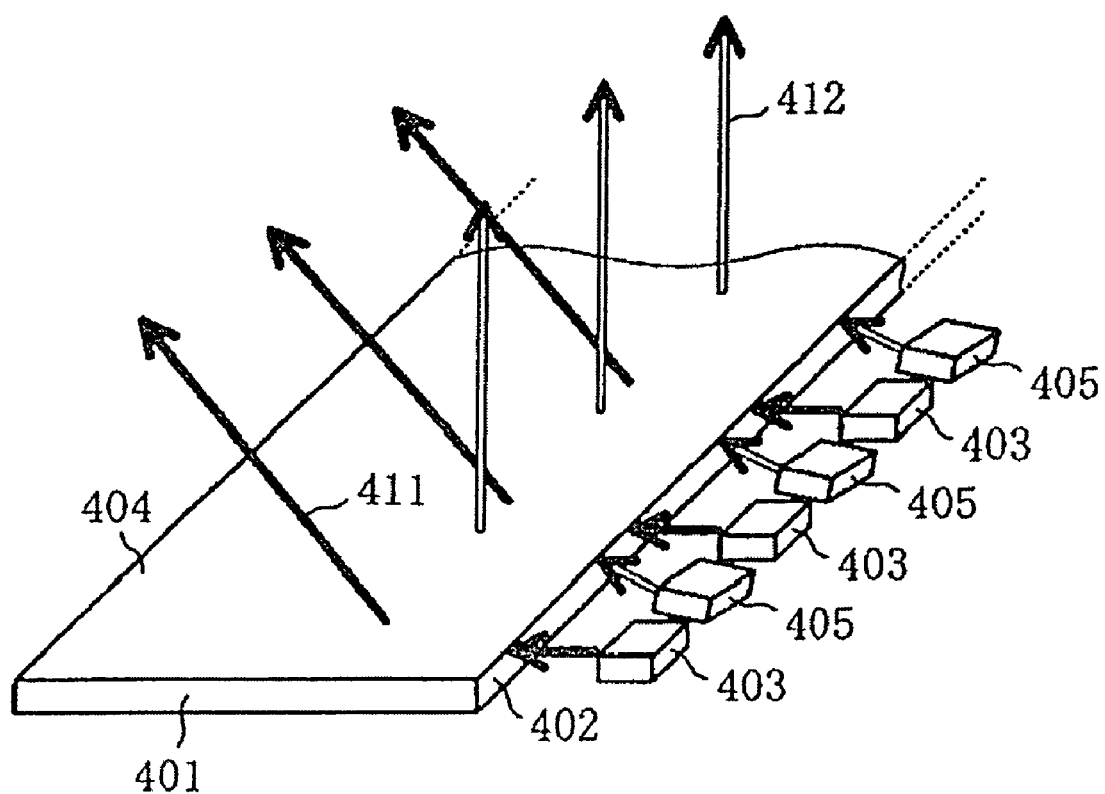
FIG. 9 is a perspective view showing an essential portion of an optical system according to a first variation of the present invention.

FIG. 9 illustrates an essential portion of an optical system according to a first variation of the present invention. This variation employs a light guide plate 401, which corresponds to the light guide plate 246 (FIG. 4) of the foregoing exemplary embodiment, and which serves to switch the direction of a light beam in two directions according to the incident angle. The light guide plate 401 is provided, on one of the lateral face 402, with first light emitting diodes 403 that emit light so as to make it incident upon the light guide plate 401 substantially orthogonally to the lateral face 402, and second light emitting diodes 405 that emit light in a direction rotated by a predetermined angle from the incident angle of the first light emitting diode 403 within a plane parallel to the output surface 404 of the light guide plate 401, the first light emitting diodes 403 and the second light emitting diodes 405 being alternately aligned lengthwise of the lateral face 402, at regular intervals.

The light guide plate 401 of the first variation emits the light incident thereon from the first light emitting diode 403, in a first direction 411 inclined by a predetermined angle from the output surface 404 of the light guide plate, and emits the light incident thereon from the second light emitting diode 405 in a second direction 412 which is perpendicular to the output surface 404 of the light guide plate. The second direction 412 does not necessarily have to be perpendicular to the output surface 404, but it suffices that the second direction 412 is different from the first direction 411.

The light thus split into the first direction 411 and the second direction 412 is incident on a sheet or a flat plate similar to the prism sheet 242 of the exemplary embodiment, to be thereby converted into the first direction 243 and the second direction 244 shown in FIG. 4 of the exemplary embodiment. Accordingly, turning on the first light emitting diode 403 in synchronization with the first image 211 described in the exemplary embodiment, and the second light emitting diode 405 in synchronization with the first image 212, at an image switching speed sufficient for producing an afterimage enables displaying the image under the condition that the single display panel 203 substantially has twice as large visual field area.

[Second Variation of the Invention]

Figure 10:
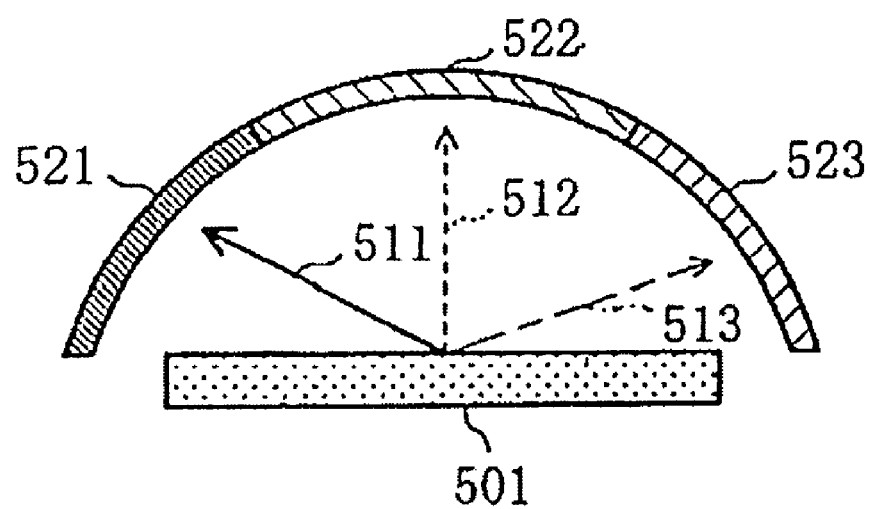
FIG. 10 is a cross-sectional view of an essential portion of an optical system according to a second variation of the present invention.

FIG. 10 depicts an essential portion of an optical system according to a second variation of the present invention. In the second variation, the direction of the light beam is switched from a first direction 511 to a third direction 513 in a direction change sheet similar to the prism sheet 242 of the exemplary embodiment, to be output therefrom. As a result, a first image 521 to a third image 523 are respectively displayed within a timing that produces an afterimage.

Figure 11:
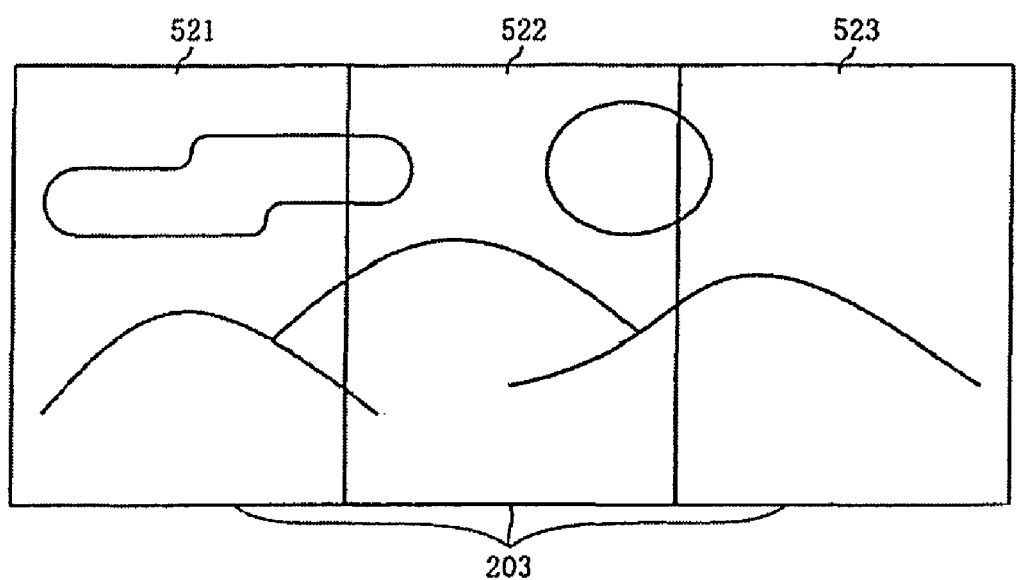
FIG. 11 is an explanatory drawing showing a state where an image of a cloud and the moon above a mountain range is displayed, according to the second variation.

FIG. 11 illustrates a state where an image of a cloud and the moon above a mountain range is displayed according to the second variation. Since the first to the third image sequentially appears according to the viewing position, the user of the mobile phone can recognize an image corresponding to three display panels sequentially and horizontally connected. Naturally the image that can be viewed at a time is of the size of a single display panel 203, however as the user shifts the eye position the display area of the image is expanded to substantially three times as large.

While the large display mode is performed by switching from the first to the third image according to the second variation, the image display in the normal display mode may be performed by outputting the light beam in all the first direction 511 to the third direction 513, or by outputting only the central light beam in the second direction 512. In the case of utilizing only the light beam in the second direction 512, the visual field range that provides a clear view of the display panel 203 is narrowed. Accordingly, for example, when the user is in a train and would not like the person on the adjacent seat to see the image, it is appropriate to output only the light bean in the second direction 512. Thus, when displaying the image in the normal display mode, selecting the direction in which the light beam is to be output allows adjusting the range of the angle of view.

[Third Variation of the Invention]

Figure 12:
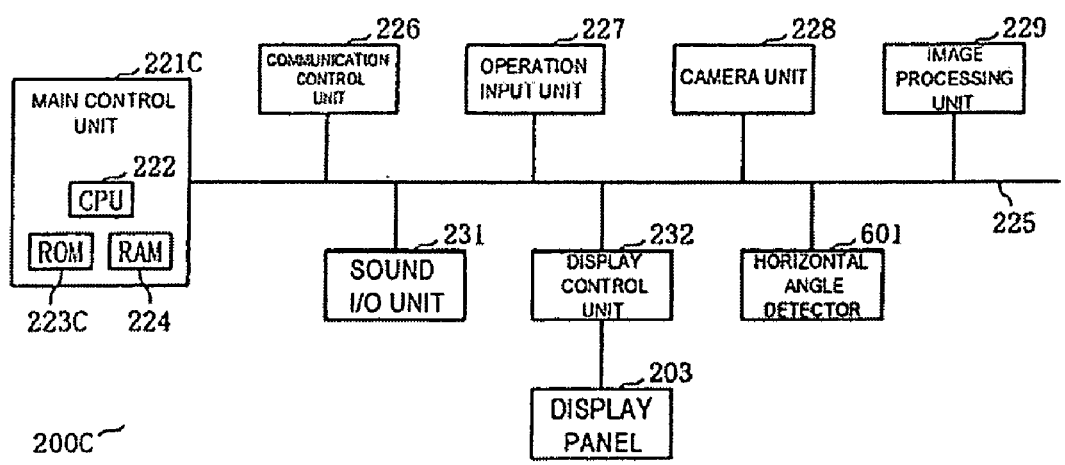
FIG. 12 is a block diagram showing an outline of the circuit configuration of a mobile phone according to a third variation.

FIG. 12 shows an outline of the circuit configuration of a mobile phone according to a third variation of the present invention. A mobile phone 200C according to this variation further includes a horizontal angle detector 601 in addition to the structure of the mobile phone 200 according to the foregoing exemplary embodiment. The horizontal angle detector 601 serves to detect whether the display panel of the mobile phone 200C is substantially horizontal or inclined, so as to switch the image to be displayed on the display panel 203 according to three angles detected. Although a main control unit 221C has the same configuration as the main control unit 221 according to the embodiment, a ROM 223C stores therein a control program designed for the mobile phone 200C of this variation. The horizontal angle detector 601 may be embodied with various sensors that can detect inclination.

Figure 13:
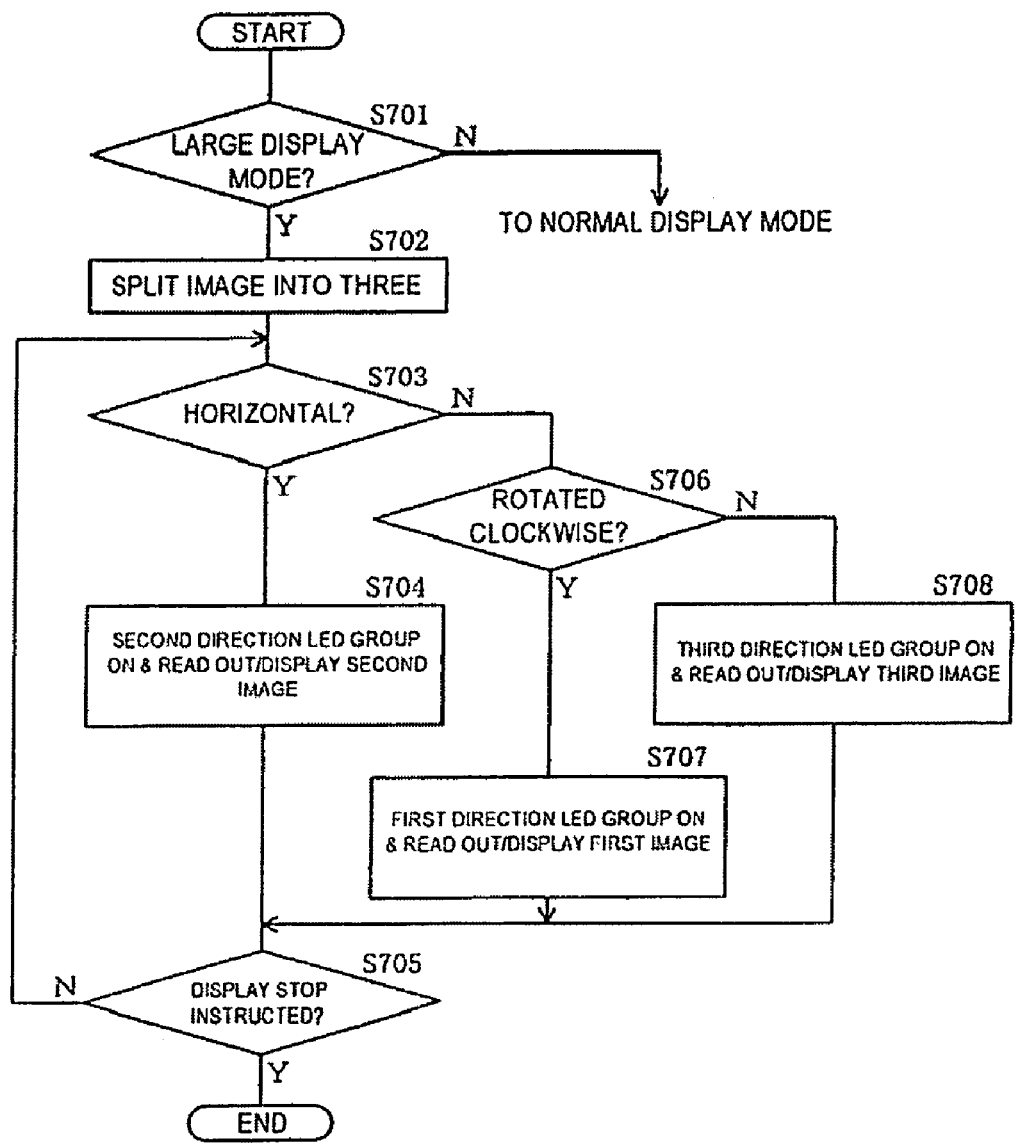
FIG. 13 is a flowchart showing a display process in a large display mode according to the third variation of the present invention.

FIG. 13 indicates a display process in the large display mode according to the third variation. It will be assumed that the image to be displayed at the step S302 of FIG. 6 is stored in the memory. Under such state, the main control unit 221C decides whether the large display mode has been selected (step S701). In the case of the normal display mode (N), the process according to the step S310 and thereafter in FIG. 6 is performed, and hence the drawings and the description will not be repeated.

On the other hand, if the large display mode is set (Y at step S701), the image is split into three portions, and each of them is stored in the respectively corresponding memory regions (step S702). Then the horizontal angle detector 601 decides whether the display panel is substantially horizontally retained (step S703). Here, the term of "substantially horizontal" refers to a state where the front side of the user's face and the display panel 203 are substantially parallel. Accordingly, the term includes the state where the display panel 203 is substantially horizontally oriented literally, and where the user retains the mobile phone 200C by hand such that the display panel is inclined forward for comfortably viewing. In both those states, the user is looking at the display panel in front of his/her face.

If the mobile phone 200C is substantially horizontal (Y at step S703), the LED group that outputs the light beam in the second direction 512 in FIG. 10 is turned on, and under such state the second image 522 is read out from the corresponding memory region, and displayed (step S704). The display of the second image 522 is continued as long as the horizontal angle detector 601 detects that the display panel is substantially horizontal, and unless the instruction to stop the display is generated (N at step S705).

When the user wishes to view the image extending to the left of the second image 522 being displayed, the user slightly rotates the mobile phone 200C in his/her hand clockwise, so that the left-side edge of the display panel 203 moves away from the user, from the frontal orientation. When the horizontal angle detector 601 resultantly detects the rotation (Y at step S706), the main control unit 221C turns on the LED group that outputs the light beam in the first direction 511 instead, and under such state the first image 521 is read out from the corresponding memory region, and displayed (step S707). The display of the first image 521 is continued as long as the horizontal angle detector 601 detects the state where the display panel is inclined clockwise, and unless the instruction to stop the display is generated (N at step S705).

On the other hand, when the user wishes to view the image extending to the right of the second image 522 currently displayed, the user slightly rotates the mobile phone 200C in his/her hand counterclockwise, opposite to the clockwise direction. When the horizontal angle detector 601 resultantly detects the rotation (Y at step S706), the main control unit 221C turns on the LED group that outputs the light beam in the third direction 513 instead, and under such state the third image 523 is read out from the corresponding memory region, and displayed (step S708). The display of the third image 523 is continued as long as the horizontal angle detector 601 detects the state where the display panel is inclined counterclockwise, and unless the instruction to stop the display is generated (N at step S705).

Thus, according to the third variation of the present invention, the user can sequentially switch the spatial region so as to recognize the three images as if being a sheet of continuous image, simply by rotating the mobile phone 200C such that an edge portion of the display panel 203 moves away and the other edge portion thereof comes closer, instead of moving his/her face. In this case, moreover, the images corresponding to the respective spatial positions do not have to be displayed so as to create the afterimage, which leads to reduced power consumption. Naturally, the images can still be switched by the rotation with the same structure of the mobile phone as the foregoing exemplary embodiment, without incorporating the horizontal angle detector 601.

The display can be switched to images corresponding to two or three, or a larger number of display panels, by moving the display panel 203 to the left and the right from the frontal position, instead of rotating the mobile phone 200C as above. To be more detailed, when a rightward movement of the user's palm holding the mobile phone 200C is detected, the first image 521 is displayed on the display panel 203, and when a leftward movement is detected the third image 523 is displayed on the display panel 203. The movement direction can be detected, for example in the case where the camera unit 223 is located on the same side of the mobile phone 200C as the display panel, by distinguishing with the camera in which direction the user's face, being the photographic subject, is shifted. Naturally, an acceleration sensor can also be employed for distinguishing the moving direction.

[Fourth Variation of the Invention]

Figure 14:
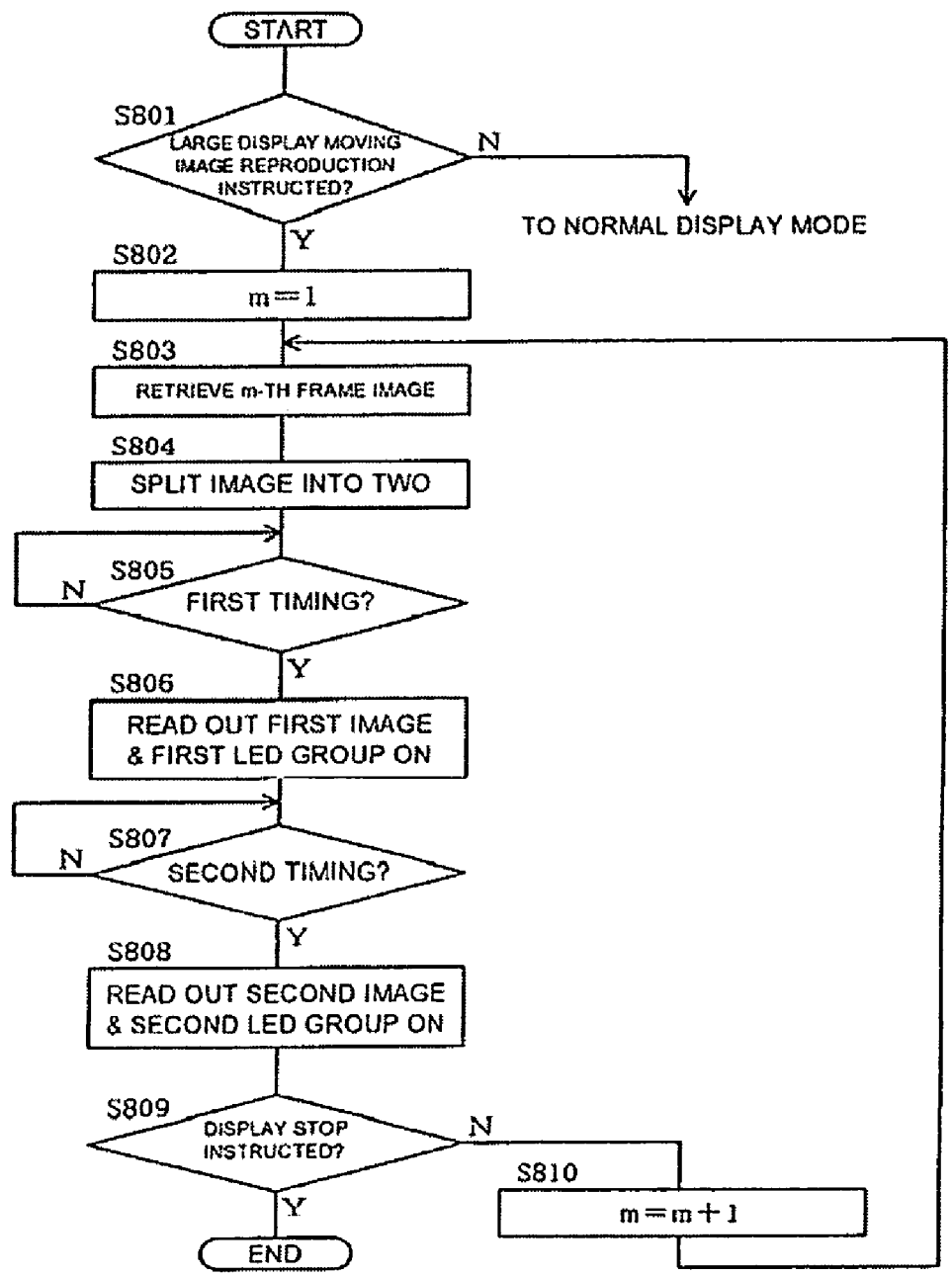
FIG. 14 is a flowchart showing a display process of a moving image in the large display mode according to a fourth variation of the present invention.
Figure 15:
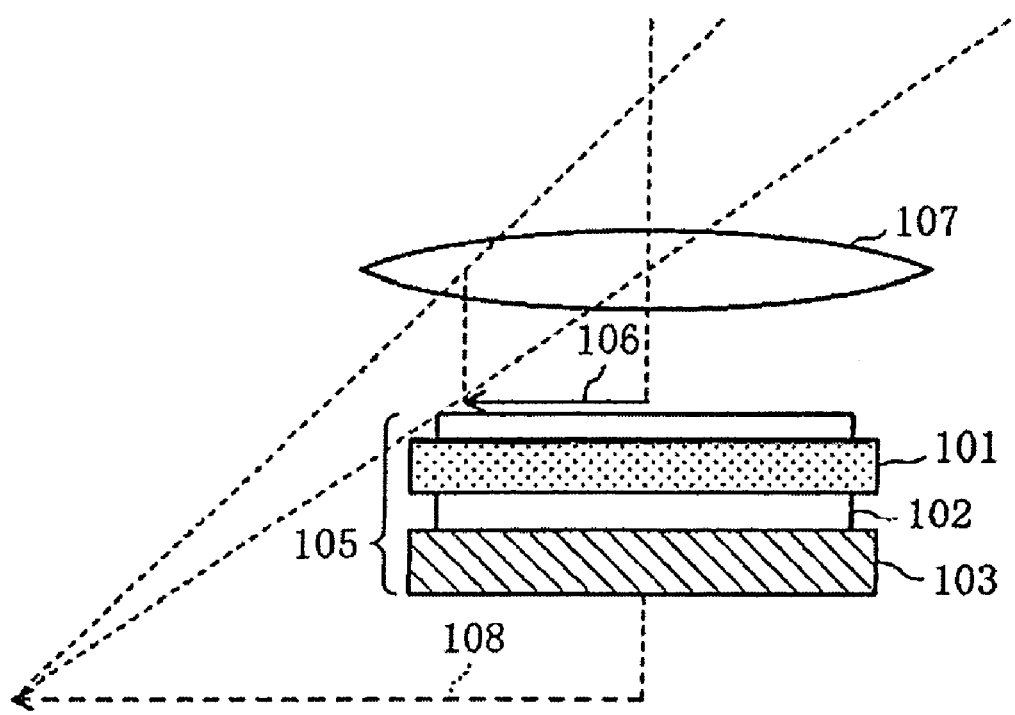
FIG. 15 is an explanatory diagram showing a conventional method of continuously displaying an enlarged image.
Figure 16:
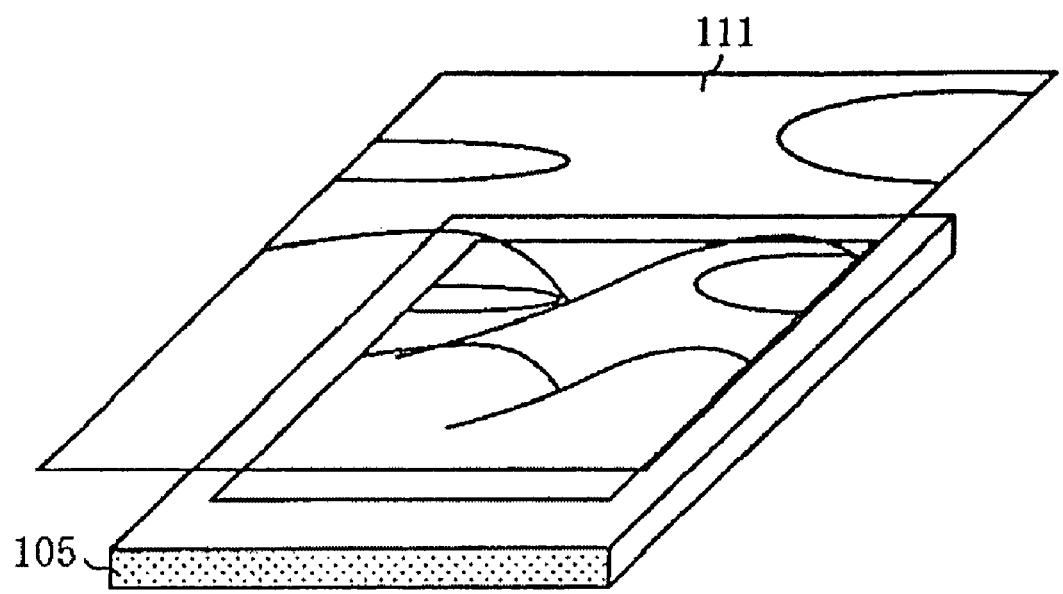
FIG. 16 is an explanatory drawing showing a liquid crystal display and an image thereby enlarged.

FIG. 14 indicates a display process of a moving image in the large display mode according to a fourth variation of the present invention. In the fourth variation, the moving image is to be reproduced with the same hardware as that of the foregoing exemplary embodiment. Once an instruction to reproduce the moving image in the large display mode is generated (Y at step S801), a parameter "m" that identifies the frame for the image to be displayed is initialized to "1" (step S802). Then the image of the m-th frame (in this case, the first frame) is retrieved (step S803). The image thus retrieved is then split into two portions so as to display a first image and a second image, and the data of the split images is separately stored in two memory regions (not shown) (step S804).

In this variation, in the case where the first image and the second image are to be sequentially displayed, for example, every 1/60 second, the process enters a standby mode for a first timing to display the first image (step S805). Upon arrival of the first timing (Y), the first image, split into two portions stored in the memory regions at the step S804, is read out. At this moment, the first LED group 247 is turned on (step S806). As a result, the first LED group 247 is turned on and the light of the image is output in the first direction 243.

Then the process enters the standby mode for a second timing to display the second image (step S807). Upon arrival of the second timing (Y), the second image, split into two portions and stored in the memory regions at the step S804, is read out. At this moment, the second LED group 248 is turned on (step S808). As a result, the second LED group 248 is turned on and the light of the image is output in the second direction 244.

One the image of the first frame is thus displayed in the size corresponding to two display panels, it is checked whether the instruction to stop the display process of the moving image in the large display mode has been generated, either by reaching the end of the moving image or by the user's instruction (step S809). If the instruction to stop the display process of the moving image in the large display mode has not been generated (N), the parameter "m" is increased by 1, and the process returns to the step S803. In other words, in this case the "m" is set as "2" and the process returns to the step S803, so that the image of the second frame is retrieved. Thereafter, similar process to the above is performed. When it is confirmed that the instruction to stop the display is generated at the step S809, the display process is finished (End).

As above, when the instruction to reproduce the moving image in the large display panel is generated, each frame that constitutes the moving image is sequentially read out, so that the moving image is reproduced such that the image corresponding to two display panels is continuously recognized, as in the case of the still image according to the foregoing exemplary embodiment. In the case where the instruction to display the moving image in the normal display mode is generated at the step S801, the display process of the moving image in the normal display mode is performed.

Although the fourth variation describes on the reproduction of the moving image corresponding to two display panels, it is equally possible to reproduce the moving image corresponding to three display panels.

Also, in the exemplary embodiment and the variations, the image display in the large display mode is performed based on viewing with one eye, however this is not the only form. In other words, in the case where the user views the image with both eyes also, the present invention can likewise be applied.

Further, although the exemplary embodiment represents the case where the present invention is applied to the image display device of the mobile phone, it is a matter of course that the present invention is applicable to all such devices that display an image, except those equipped with a very large-scaled display panel.

What is claimed is:

1. An image display device comprising:
   a display panel that displays a sheet of image;
   a spatial region setting unit that defines a plurality of spatial regions where an image displayed on said display panel can be visually recognized from mutually different spatial positions;
   an image splitter that splits a piece of image having a larger display area than said sheet of image corresponding to a display area of said display panel, into a plurality of sheets of images respectively corresponding to each of said plurality of spatial regions; and
   an image display unit that causes said display panel to splitly display said plurality of sheets of images in different display directions, such that each of said plurality of sheets of images split by said image splitter can be visually recognized from the corresponding one of said mutually different spatial positions, further comprising:
   an inclination detector that detects an inclination of said display panel;
   wherein said image display unit displays one of said plurality of sheets of images in correlation with said spatial region, according to a detection result provided by said inclination detector.

2. The image display device according to claim 1, wherein said image display unit causes said display panel to alternately display each of said plurality of sheets of images formed by splitting said piece of image, at a switching cycle that creates an afterimage in said mutually different spatial positions.

3. The image display device according to claim 2, further comprising:
   a light emitting diode that alternatively emits light along different paths, and a prism sheet that outputs light in one of a plurality of directions according to an incident angle.

4. The image display device according to claim 1, wherein said spatial region setting unit includes a selective light emitting unit that selectively emits light in a plurality of different directions, and a light path setting unit that sets a plurality of directions where a content on said display panel can be viewed, according to a direction of said light emitted by said selective light emitting unit.

5. The image display device according to claim 1, further comprising:
   a light emitting diode that alternatively emits light along different paths, and a prism sheet that outputs light in one of a plurality of directions according to an incident angle.

6. The image display device according to claim 1, further comprising:
   a light emitting diode that alternatively emits light along different paths, and a prism sheet that outputs light in one of a plurality of directions according to an incident angle.

7. An image display device comprising:
   a display panel that displays a sheet of image;
   a spatial region setting unit that defines a plurality of spatial regions where an, image displayed on said display panel can be visually recognized from mutually different spatial positions;
   an image splitter that splits a piece of image having a larger display area than said sheet of image corresponding to a display area of said display panel, into a plurality of sheets of images respectively corresponding to each of said plurality of spatial regions; and
   an image display unit that causes said display panel to splitly display said plurality of sheets of images in different display directions, such that each of said plurality of sheets of images split by said image splitter can be visually recognized from the corresponding one of said mutually different spatial positions, further comprising:
   a horizontal position detector that detects a horizontal position of said display panel;
   wherein said image display unit displays one of said plurality of sheets of images in correlation with said spatial region, according to a detection result provided by said horizontal position detector.

8. The image display device according to claim 7, further comprising:
   a light emitting diode that alternatively emits light along different paths, and a prism sheet that outputs light in one of a plurality of directions according to an incident angle.

9. The image display device according to claim 7, wherein said image display unit causes said display panel to alternately display each of said plurality of sheets of images formed by splitting said piece of image, at a switching cycle that creates an afterimage in said mutually different spatial positions.

10. The image display device according to claim 9, further comprising:
    a light emitting diode that alternatively emits light along different paths, and a prism sheet that outputs light in one of a plurality of directions according to an incident angle.

11. The image display device according to claim 7, wherein said spatial region setting unit includes a selective light emitting unit that selectively emits light in a plurality of different directions, and a light path setting unit that sets a plurality of directions where a content on said display panel can be viewed, according to a direction of said light emitted by said selective light emitting unit.

12. The image display device according to claim 7, further comprising:

a light emitting diode that alternatively emits light along different paths, and a prism sheet that outputs light in one of a plurality of directions according to an incident angle.

* * * * *